(12) United States Patent
Dou et al.

(10) Patent No.: US 10,152,546 B2
(45) Date of Patent: Dec. 11, 2018

(54) METHOD, SYSTEM AND TERMINAL FOR PERFORMING SEARCH IN A BROWSER

(71) Applicant: TENCENT TECHNOLOGY (SHENZHEN) COMPANY LIMITED, Shenzhen (CN)

(72) Inventors: Ningjun Dou, Shenzhen (CN); Fang Huang, Shenzhen (CN); Jun Xue, Shenzhen (CN); Ximin Yu, Shenzhen (CN); Yi Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 348 days.

(21) Appl. No.: 15/004,944

(22) Filed: Jan. 24, 2016

(65) Prior Publication Data
US 2016/0147897 A1 May 26, 2016

Related U.S. Application Data

(63) Continuation of application No. PCT/CN2014/083179, filed on Jul. 29, 2014.

(30) Foreign Application Priority Data

Jul. 31, 2013 (CN) .......................... 2013 1 0329202

(51) Int. Cl.
*G06F 17/30* (2006.01)
*G06F 3/0482* (2013.01)
(Continued)

(52) U.S. Cl.
CPC ...... *G06F 17/30867* (2013.01); *G06F 3/0482* (2013.01); *G06F 3/0485* (2013.01);
(Continued)

(58) Field of Classification Search
CPC ......... G06F 17/30867; G06F 17/30554; G06F 17/30861; G06F 3/0482; G06F 3/04842; G06F 3/0485
See application file for complete search history.

(56) References Cited

U.S. PATENT DOCUMENTS 8,527,882 B2 * 9/2013 Swartz .................. G06F 3/0481
707/706
2006/0155728 A1 7/2006 Bosarge
(Continued)

FOREIGN PATENT DOCUMENTS

CN 101369266 A 2/2009
CN 101388032 A 3/2009
(Continued)

OTHER PUBLICATIONS

The World Intellectual Property Organization (WIPO) International Search Report for PCT/CN2014/083179 dated Oct. 27, 2014.
(Continued)

*Primary Examiner* — Huawen A Peng
(74) *Attorney, Agent, or Firm* — Anova Law Group, PLLC

(57) ABSTRACT

A method for performing a search in a browser is provided. The method includes receiving one or more keywords entered in a current search engine and searching data from the current search engine based on the entered keywords. The method also includes displaying a search engine results page from the current search engine to a user and displaying alternative search engines when detecting that an operation event of the user in the search engine results page meets preset switching criteria. Further, the method includes extracting a search web address template corresponding to an alternative search engine selected by the user and loading the entered keywords into the search web address template corresponding to the selected alternative search engine to search data from the alternative search engine. In addition, the method includes displaying a search engine results page from the selected alternative search engine.

16 Claims, 5 Drawing Sheets

(51) Int. Cl.
  *G06F 3/0484* (2013.01)
  *G06F 3/0485* (2013.01)
(52) U.S. Cl.
  CPC .... *G06F 3/04842* (2013.01); *G06F 17/30554* (2013.01); *G06F 17/30861* (2013.01)

(56) References Cited

U.S. PATENT DOCUMENTS

| 2010/0042590 | A1* | 2/2010 | Smyros | G06F 17/30616 707/706 |
| 2013/0132357 | A1 | 5/2013 | Edgar et al. | |
| 2013/0238587 | A1* | 9/2013 | Annau | G06F 17/30666 707/708 |

FOREIGN PATENT DOCUMENTS

| CN | 102486778 A * | 6/2012 |
| CN | 102486778 A | 6/2012 |
| TW | 200713039 A | 4/2007 |

OTHER PUBLICATIONS

The Intellectual Property Office of ROC (TIPO) Office Action 1 for 103126054 dated Oct. 28, 2015.

* cited by examiner

METHOD, SYSTEM AND TERMINAL FOR PERFORMING SEARCH IN A BROWSER

CROSS-REFERENCES TO RELATED APPLICATIONS

This application is a continuation application of PCT Patent Application No. PCT/CN2014/083179, filed on Jul. 29, 2014, which claims priority of Chinese Patent Application No. 201310329202.6, filed on Jul. 31, 2013, the entire contents of both of which are incorporated by reference herein.

FIELD OF THE INVENTION

The present invention generally relates to the field of browser search engine technologies and, more particularly, to methods, systems and terminals for performing a search in a browser.

BACKGROUND

A search engine is a specific computer program that can search data from the Internet based on specific search strategies set by service providers, and display the data to users after the searched data is organized and processed. The search engine provides retrieval services for the users, and displays related data and information searched through keywords to the users.

Because the search strategies set by different service providers are not the same, the data searched based on the same keyword using different search engines may be not the same. When a current user searches data using a search engine, if the user does not find the needed data, the user may switch to other search engines to repeat the search.

However, in existing search engine switching methods, after a user completes a search using a search engine, the user needs to manually open a search webpage of another search engine and re-enter the corresponding keywords to repeat the search. The manual switching method is time consuming and the efficiency of switching search engines is relatively low. Because switching search engines is an important aspect of computer technology dealing with Internet applications, technical solutions are needed to solve and/or improve the issues associated with the existing search engine switching methods.

The disclosed methods and systems are directed to solve one or more problems set forth above and other problems.

BRIEF SUMMARY OF THE DISCLOSURE

One aspect of the present disclosure includes a method for performing a search in a browser. The method includes receiving one or more keywords entered by a user in a current search engine through the browser and searching data from the current search engine based on the keywords entered in the current search engine. The method also includes displaying a search engine results page from the current search engine to the user and displaying alternative search engines when detecting that an operation event of the user in the search engine results page meets preset switching criteria. Further, the method includes extracting a search web address template corresponding to an alternative search engine selected by the user and loading the keywords entered in the current search engine into the search web address template corresponding to the selected alternative search engine to search data from the alternative search engine. In addition, the method also includes displaying a search engine results page from the selected alternative search engine.

Another aspect of the present disclosure includes a system for performing a search in a browser. The system includes a search module configured to search data from the current search engine based on keywords entered by a user in a current search engine of the browser and display a search engine results page from the current search engine to the user. The system also includes a display module configured to display alternative search engines when detecting that an operation event of a user in the current search engine results page meets preset switching criteria. Further, the system includes a processing module configured to extract a search web address template of an alternative search engine selected the user, to load the keywords entered in the current search engine into the search web address template of the selected alternative search engine to search data from the alternative search engine, and to display a search engine results page from the selected alternative search engine.

Another aspect of the present disclosure includes a terminal for performing a search. The terminal includes a search module configured to search data from the current search engine based on keywords entered by a user in a current search engine of the browser and display a search engine results page from the current search engine to the user. The terminal also includes a display module configured to display alternative search engines when detecting that an operation event of a user in the current search engine results page meets preset switching criteria. Further, the terminal includes a processing module configured to extract a search web address template of an alternative search engine selected by the user, to load the keywords entered in the current search engine into the search web address template of the selected alternative search engine to search data from the alternative search engine, and to display a search engine results page from the selected alternative search engine.

Other aspects of the present disclosure can be understood by those skilled in the art in light of the description, the claims, and the drawings of the present disclosure.

BRIEF DESCRIPTION OF THE DRAWINGS

In order to describe the technical solution of the embodiments of the present invention more clearly, drawings used in the description of the embodiments are introduced below. The drawings described below are merely some exemplary embodiments of the present invention. For those skilled in the art, on the premise of no inventive effort being involved, other drawings may also be obtained according to these drawings and the descriptions included herein.

DETAILED DESCRIPTION

In the following description, for purposes of illustration, many specific details are illustrated in order to provide a full understanding of one or more embodiments. However, obviously, those embodiments can also be implemented in the case of these specific details changed, replaced, or alternated. The followings, together with accompanying drawings, describe in detail certain embodiments of the present invention.

As used herein, unless otherwise specified, the term "search engine" in this disclosure may also be referred to as "engine". The term "webpage" in this disclosure may also be referred to as "page". The term "search keywords" in this disclosure may also be referred to as "keywords".

As used herein, "switching search engine" in this disclosure refers to switching from one search engine to another search engine. For example, "switching search engine" can include switching from a current search engine to a search engine selected from other search engine options.

Figure 7:
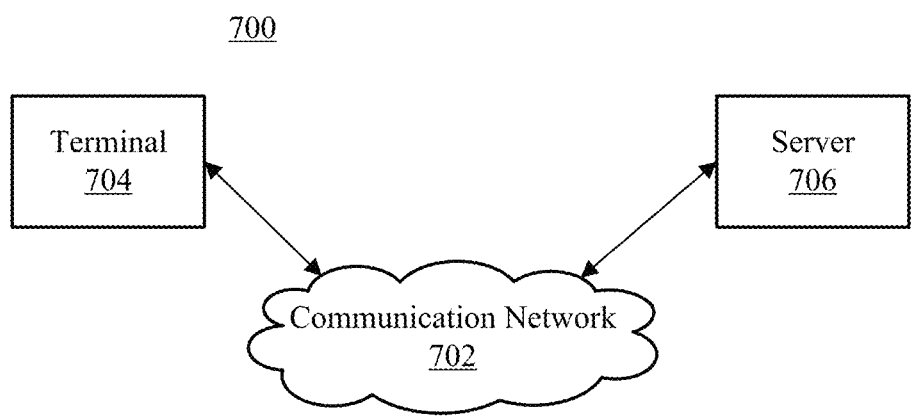
FIG. 7 shows an environment incorporating certain aspects of the present invention.

FIG. 7 shows an exemplary environment incorporating exemplary methods and system for switching search engine in accordance with various disclosed embodiments. As shown in FIG. 7, the environment 700 can include a server 704, a terminal 706, and a communication network 702. The server 704 and the terminal 706 may be coupled through the communication network 702 for information exchange, such as Internet searching, webpage browsing, etc. Although only one terminal 706 and one server 704 are shown in the environment 700, any number of terminals 706 or servers 704 may be included, and other devices may also be included.

The communication network 702 may include any appropriate type of communication network for providing network connections to the server 704 and terminal 706 or among multiple servers 704 or terminals 706. For example, the communication network 702 may include the Internet or other types of computer networks or telecommunication networks, either wired or wireless.

A terminal, as used herein, may refer to any appropriate user terminal with certain computing capabilities including, e.g., providing a browser for webpage browsing and for receiving information (such as keywords) entered by a user for web searching. For example, a terminal can be a personal computer (PC), a work station computer, a server computer, a handheld computing device (tablet), a mobile terminal (a mobile phone or a smart phone), or any other user-side computing device.

A server, as used herein, may refer to one or more server computers configured to provide certain server functionalities, such as searching the web. As in various embodiments disclosed herein, a search engine server can perform webpage searches using keywords transmitted by a search engine. A server may also include one or more processors to execute computer programs in parallel.

Figure 8:
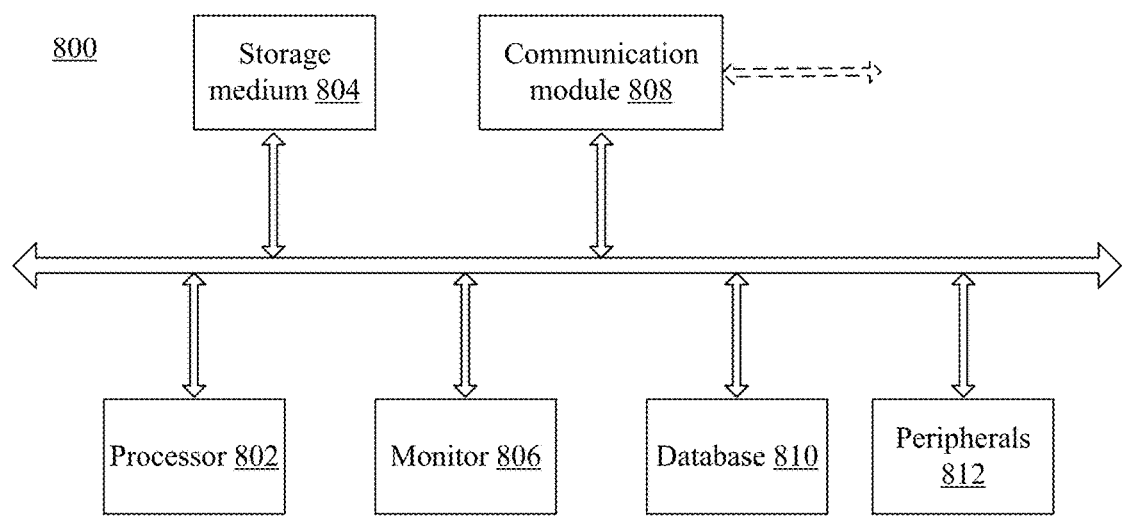
FIG. 8 shows a block diagram illustrating an exemplary computing system consistent with the disclosed embodiments.

The server 704 and the terminal 706 may be implemented on any appropriate computing platform. FIG. 8 shows a block diagram illustrating an internal architecture of a computing system capable of implementing the server 704 and/or the terminal 706. As shown in FIG. 8, the exemplary computer system 800 may include one or more processors 802, a storage medium 804, a monitor 806, a communication module 808, a database 810, peripherals 812, and one or more bus 814 to couple the devices together. Certain devices may be omitted and other devices may be included.

The processor 802 can include any appropriate processor or processors. Further, the processor 802 can include multiple cores for multi-thread or parallel processing. For example, the processor 802 may search data based on keywords entered in a current search engine. The storage medium 804 may include memory modules, such as ROM, RAM, and flash memory modules, and mass storages, such as CD-ROM, U-disk, removable hard disk, etc. The storage medium 804 may store computer programs (e.g., a browser) for implementing various processes, when executed by the processor 802. The browser is an application that includes a graphical user interface, which allows a user to easily navigate through a node network.

The monitor 806 may include display devices for displaying information. For example, the monitor 806 of the terminal 706 can be used by a user to display browser windows, webpage contents, a search engine results page of a current search engine, etc. The communication module 808 may include network devices for establishing connections through the communication network 702. The database 810 may include one or more databases for storing certain data and for performing certain operations on the stored data. Further, the peripherals 812 may include I/O devices such as keyboard and mouse. For example, the peripherals 812 of the terminal 706 can be used by a user to input keywords for webpage searching, and/or to click certain option buttons in a browser window.

In operation, the terminal 706 may cause the server 704 to perform certain actions, such as a web search or other database operations. The server 704 may be configured to provide structures and functions for such actions and operations. More particularly, the server 704 may be a search engine server for webpage searching. That is, the search engine server can access databases of Internet resources, search for specific information or keywords, and report the results.

In various embodiments, a terminal such as a user-side electronic device involved in the disclosed embodiments can include the terminal 706, while a server such as a search engine server involved in the disclosed embodiments can include the server 704.

Figure 1:
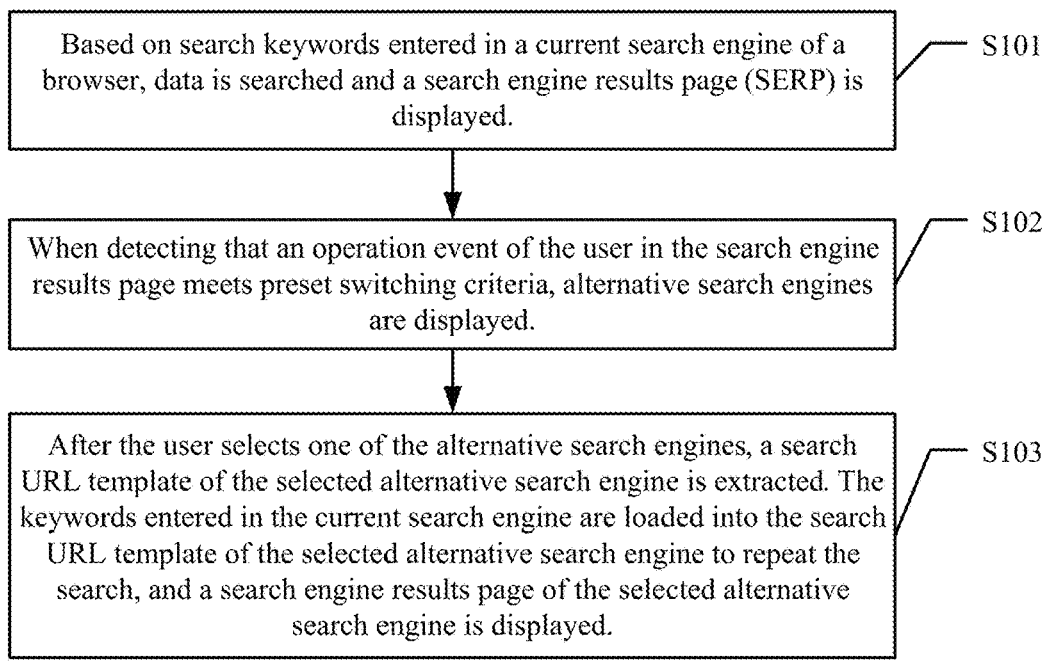
FIG. 1 illustrates a flow chart of an exemplary process for performing a search in a browser consistent with the disclosed embodiments.

FIG. 1 illustrates a flow chart of an exemplary process for performing a search in a browser consistent with the disclosed embodiments. The process may be applied in Personal Computers (PCs), laptops, smart phones, Tablet PCs, wearable smart devices, and so on. As shown in FIG. 1, the process may include the following steps.

S101: based on search keywords entered in a current search engine of a browser, data is searched and a search engine results page (SERP) is displayed.

When performing the first search, a user may access a corresponding server by entering a Universal Resource Locator (URL, also known as a web address) of a search engine (e.g., Soso, Baidu, Google, etc.) in a web browser installed in a terminal. Then, the user enters the keywords in a keyword input box of the search engine, and clicks a "search" button to perform the search operation. After the search engine organizes and arranges the obtained data, the search engine returns a search engine results page (SERP) to the user. The SERP refers to a listing of results returned by a search engine in response to a keyword search query. The results normally include a list of items with titles, a reference to the full version, and a short description showing where the keywords matched content within the page. The SERP may include a single page of links returned, or a set of all links returned for the search query. The user can view each piece of data information by sliding a scrollbar of the search engine results page using a mouse.

S102: when detecting that an operation event of the user in the search engine results page meets preset switching criteria, alternative search engines are displayed.

Because search strategies (e.g., how a search engine decides which pages are the best matches, what order the results should be shown in, etc.) vary widely from one search engine to another search engine, the obtained search engine results page is different for every search engine. When the user views the search engine results page, if the user slides the scrollbar to the bottom of the search engine results page, or the user slides the scrollbar to the top again after the user slides the scrollbar to the bottom of the search engine results page, or the user clicks a "next page" button, it is considered that the user does not find the needed data in the search engine results page searched by using the current search engine or the user desires for broader topic coverage. Thus, the operation event of the user meets the preset switching criteria. Further, the alternative search engines are displayed to the user.

The displayed alternative search engines may include multiple search engines. In S102, a user interface (UI) control of an operation system installed on the terminal can be called to render a search engine switching UI. Then, icons of the one or more alternative search engines are added to the search engine switching UI. That is, every icon is associated with a particular search provider. The search engine switching UI is a search engine switching panel that displays the alternative search engines for the user to select.

Figure 2:
FIG. 2 illustrates a schematic diagram of an exemplary interface for displaying alternative search engines consistent with the disclosed embodiments.

The alternative search engines may be stored in advance in an alternative search engine set. Or, the alternative search engines may also be other search engines (except the current search engine) pulled from the server when the alternative search engines need to be displayed. FIG. 2 illustrates a schematic diagram of an exemplary user interface for displaying alternative search engines consistent with the disclosed embodiments.

As shown in FIG. 2, the user interface for displaying the alternative search engines can be placed at the bottom, at the top, or at the two sides of the search engine results page of the current search engine. The position of the user interface for displaying the alternative search engines is not limited herein.

Based on screen size of a terminal, one or more search engines may be randomly selected as the alternative search engines from the search engine set and added to the search engine switching UI. Specifically, icons corresponding to the one or more selected search engines are added to the search engine switching UI. Further, link addresses or preset search URL templates corresponding to the one or more selected search engines are associated with the corresponding icons (i.e., search engine icons). Each search engine contains a search URL template which is a main component of the search engine URL. For example, a search URL template of Soso search engine is http://wap.soso.com/gweb/index.jsp?key=, keywords can be entered following the equal sign"=" to form a URL, where the formed URL is used to request search results searched by Soso search engine using the entered keywords.

S103: after the user selects one of the alternative search engines, a search URL template of the selected alternative search engine is extracted. The keywords entered in the current search engine are loaded into the search URL template of the selected alternative search engine to repeat the search, and a search engine results page of the selected alternative search engine is displayed.

In certain embodiments, the search URL template of the alternative search engine is correlated to the search engine switching UI, so that when the user clicks and selects one of the alternative search engines, the keywords entered in the current search engine can be loaded into the search URL template of the selected alternative search engine. Thus, the search can be directly initiated. The search engine switching UI is not only an interface for providing the alternative search engines, it enables the user to rapidly switch the search engines.

Specifically, using Soso search as an example. If a Soso search engine is an alternative search engine, a corresponding search URL template of Soso webpage is: http://wap.soso.com/gweb/index.jsp?key=. In S103, when the user selects the Soso search engine as the alternative search engine, the keywords (i.e. Beijing subway) entered in the current search engine are entered directly following the equal sign "=", that is, http://wap.soso.com/gweb/index.jsp?key=beijing subway. Then, based on the web address "http://wap.soso.com/gweb/index.jsp?key=Beijing subway", an access request is sent to the search engine server to search the corresponding data.

After the search results are obtained, the search results are organized and arranged. Further, a search engine results page corresponding to the alternative search engine (i.e., Soso search engine) is displayed to the user. A new tab can be opened in the browser to display the search engine results page corresponding to the alternative search engine. The search engine results page corresponding to the current search engine may also be refreshed to display the search engine results page corresponding to the alternative search engine.

In the above steps, the users can repeat the search without re-entering the keywords, improving the efficiency of switching search engine.

After the first search is performed, based on the operations of the user, the alternative search engines are displayed to the user such that the user can rapidly switch from the current search engine to other search engines to repeat the search using the corresponding keywords. The method meets the user's demand for automation and intelligence. The method also saves the user's time and improves the efficiency of switching search engine.

Figure 3:
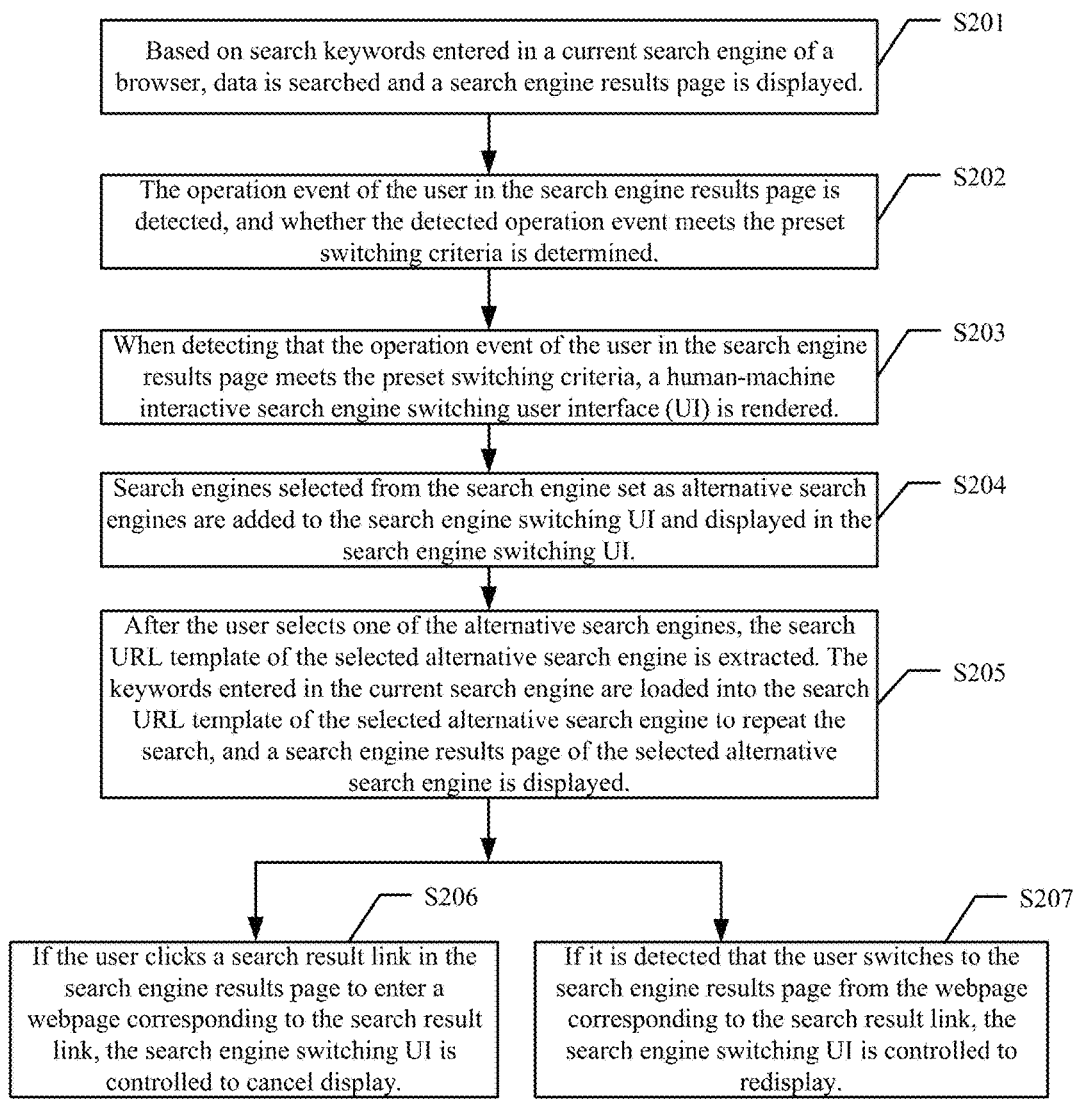
FIG. 3 illustrates a flow chart of another exemplary process for performing a search in a browser consistent with the disclosed embodiments.

FIG. 3 illustrates a flow chart of another exemplary process for performing a search in a browser consistent with the disclosed embodiments. The process may be applied in Personal Computers (PCs), laptops, smart phones, Tablet PCs, wearable smart devices, and so on. As shown in FIG. 3, the process may include the following steps.

S201: based on search keywords entered in a current search engine of a browser, data is searched and a search engine results page is displayed.

Before performing S201, the process may also include the following steps.

A search engine set is configured, and the configured search engine set is embedded in the browser; or the search engine set is formed by pulling the search engines from the server. That is, the search engine set is preset so that, when detecting that an operation event of a user meets preset switching criteria, one or more search engines can be extracted at any time from the search engine set as an alternative search engine/or alternative search engines and displayed for the user.

S202: the operation event of the user in the search engine results page is detected, and whether the detected operation event meets the preset switching criteria is determined.

When a URL of a webpage accessed by a user begins with a search URL template corresponding to a search engine, it may be determined that the user accesses a search engine results page of the corresponding search engine. Then, whether the detected operation event of the user meets the preset switching criteria is determined.

The switching criteria may be set based on the operation event of the user, such as a mouse sliding event, a mouse clicking event, etc. In S202, determining whether the detected operation event meets the preset switching criteria may include the followings.

Whether the operation event of the user in the search engine results page is a scrolling operation event and whether the scrolling operation event controls the search engine results page to scroll to the bottom of the page are judged. If the operation event is the scrolling operation event and the scrolling operation event controls the search engine results page to scroll to the bottom of the page, it is determined that the scrolling operation event meets the preset switching criteria.

Whether the operation event of the user in the search engine results page is a scrolling operation event and whether the scrolling operation event controls the search engine results page to scroll to the bottom of the page and re-scroll to the top of the page are judged. If the operation event is the scrolling operation event and the scrolling operation event controls the search engine results page to scroll to the bottom of the page and re-scroll to the top of the page, it is determined that the scrolling operation event meets the preset switching criteria.

Further, judgments of some other operation events can also be included. For example, in general, data that best match the keywords is listed in the first page of the search engine results page. If a user clicks a "next page" button of the search engine results page of the current search engine, the probability that the user can find the needed data is relatively low. Therefore, the operation event of clicking the "next page" button also meets the preset switching criteria.

S203: when detecting that the operation event of the user in the search engine results page meets the preset switching criteria, a search engine switching human-machine interactive user interface (UI) is rendered.

Specifically, a UI control of an operation system installed in a terminal is called to render the search engine switching UI.

S204: search engines selected from the search engine set as alternative search engines are added to the search engine switching UI and displayed in the search engine switching UI.

Based on screen size of a user terminal, one or more search engines are randomly selected as the alternative search engines from the search engine set and added to the search engine switching UI. Specifically, icons corresponding to the one or more selected search engines are added to the search engine switching UI. Further, link addresses or preset search URL templates corresponding to the one or more selected search engines are associated with the corresponding icons. In certain embodiments, the preset search URL templates corresponding to the one or more selected search engines are associated with the corresponding icons. When selecting the search engines from the search engine set, the search engines other than the current search engine are selected as the alternative search engines. S203 and S204 may refer to S102 shown in FIG. 1.

S205: after the user selects one of the alternative search engines, the search URL template of the selected alternative search engine is extracted. The keywords entered in the current search engine are loaded into the search URL template of the selected alternative search engine to repeat the search, and a search engine results page of the selected alternative search engine is displayed.

In S205, after the search engine results page of the selected alternative search engine is displayed, the current search engine is added to the search engine switching UI and displayed in the search engine switching UI. After the search engine results page of the selected alternative search engine is displayed, other search engines (except the current search engine and the selected alternative search engine) may also be selected from the search engine set to add to the search engine switching UI.

S206: if the user clicks a search result link in the search engine results page to enter a webpage corresponding to the search result link, the search engine switching UI is controlled to cancel display.

S207: if it is detected that the user switches to the search engine results page from the webpage corresponding to the search result link, the search engine switching UI is controlled to redisplay.

In S206 and S207, after the search engine switching UI including the alternative search engines is displayed, when the user remains or switches to the search engine results page, the display of the search engine switching UI is kept; when the user clicks and selects a search result link in the search engine results page to enter a webpage corresponding to the search result link, in order not to affect the user to view the webpage contents corresponding to the search result link, the search engine switching UI is disappeared.

After the first search is performed, based on the user's operations, the search engine switching UI is generated by the operation system installed in the terminal to display the alternative search engines to the user, such that the user can rapidly switch from the current search engine to other search engines to repeat the search using the corresponding keywords. In addition, the search can be automatically performed based on the keywords entered in the current search engine. The method meets the user's demand for automation and intelligence. The method also saves the user's time and improves the efficiency of switching search engine.

Figure 4:
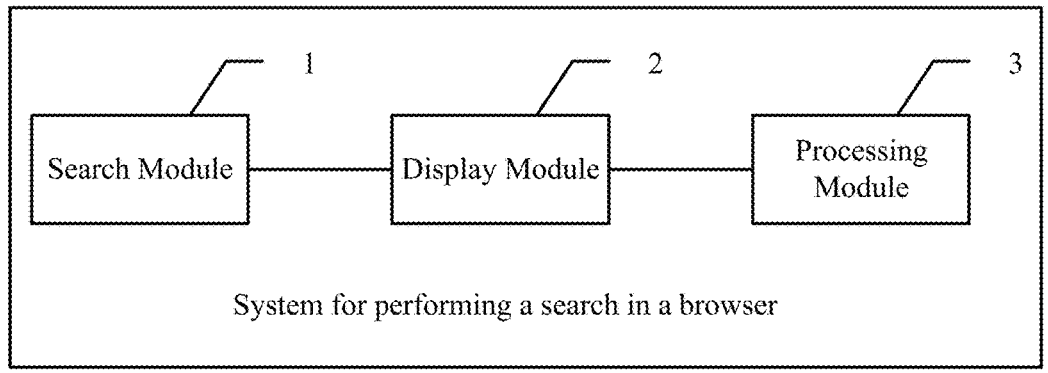
FIG. 4 illustrates a structure schematic diagram of an exemplary system for performing a search in a browser consistent with the disclosed embodiments.

FIG. 4 illustrates a structure schematic diagram of an exemplary system for performing a search in a browser consistent with the disclosed embodiments. The system for performing a search in a browser may be implemented in software, hardware, or a combination of software and hardware. The system for performing a search in a browser may also be an independent widget or distributed over different devices/systems, such as a terminal and a server.

The system may be installed in Personal Computers (PCs), laptops, smart phones, Tablet PCs, wearable smart devices, and so on. As shown in FIG. 4, the system may include a search module 1, a display module 2, and a processing module 3. A person skilled in the art may understand that the structure of the system for performing a search in a browser in FIG. 4 is not limiting, and more or fewer components than those shown may be included, or some components may be combined, or different component arrangement may be included.

The search module 1 is configured to search data based on keywords entered in a current search engine of a browser and display a search engine results page of the current search engine.

The display module 2 is configured to, when detecting that an operation event of a user in the current search engine results page meets preset switching criteria, display alternative search engines.

The processing module 3 is configured to, after the user selects one of the alternative search engines, extract a search URL template of the selected alternative search engine, load the keywords entered into the current search engine to the search URL template of the selected alternative search engine to search data, and display a search engine results page of the selected alternative search engine.

When performing the first search, based on a URL of a search engine entered in a browser by a user, the search module 1 accesses the corresponding search engine server, and performs the data search based on keywords entered in a search box of the search engine. The search module 1 returns a search engine results page to the user after the search module 1 organizes and arranges the searched data. The user can view each piece of the data information by sliding a scrollbar of the search engine results page using a mouse.

When the user views the search engine results page, if the user slides the scrollbar to the bottom of the search engine results page, or the user slides the scrollbar to the bottom of the search engine results page and re-slides the scrollbar to the top of the search engine results page, or the user clicks a "next page" button of the search engine results page, it is considered that the user does not find the needed data in the search engine results page searched by using the current search engine or the user desires for broader topic coverage. The display module 2 considers that the detected sliding or clicking operations meet the preset switching criteria, and displays the alternative search engines to the user.

The alternative search engines displayed by the display module 2 may include multiple search engines. Specifically, a UI control of an operation system of a terminal is called to render the search engine switching UI and add icons of the one or more alternative search engines to the search engine switching UI.

The alternative search engines may be stored in advance in an alternative search engine set. Or, the alternative search engines may also be other search engines (except the current search engine) pulled from the server. The search engine switching UI displayed by the display module 2 can be placed at the bottom, at the top, or at the two sides of the search engine results page of the current search engine. The position of the user interface for displaying the alternative search engines is not limited herein.

The display module 2 is also configured to, based on screen size of the user terminal, randomly select one or more search engines from the search engine set and add the selected search engines to the search engine switching UI. Specifically, icons corresponding to one or more selected search engines are added to the search engine switching UI. Further, links or preset search URL templates corresponding to the one or more selected search engines are associated with the corresponding icons. In the present embodiment, the preset search URL templates corresponding to the one or more selected search engines are associated with the corresponding icons.

The switching UI may be overlapped on a part of the display of current search results. Further, the display module 2 may display the switching UI when the user starts scrolling the current search results, or may display switching UI when the current searching results are displayed. Other display methods may also be used.

A search URL template of an alternative search engine is correlated to a search engine switching UI, such that when the user clicks and selects the alternative search engine, the keywords entered in the current search engine can be loaded into the search URL template of the alternative search engine. Thus, the search can be directly initiated. The search engine switching UI is not only an interface for providing the alternative search engines, it enables the user to rapidly switch the search engines.

After the first search is performed, the alternative search engines are displayed to the user based on the user's operations, such that the user can rapidly switch from the current search engine to other search engines to repeat the search using the corresponding keywords. The method meets the user's demand for automation and intelligence. The method also saves the user's time and improves the efficiency of switching search engine.

Figure 5:
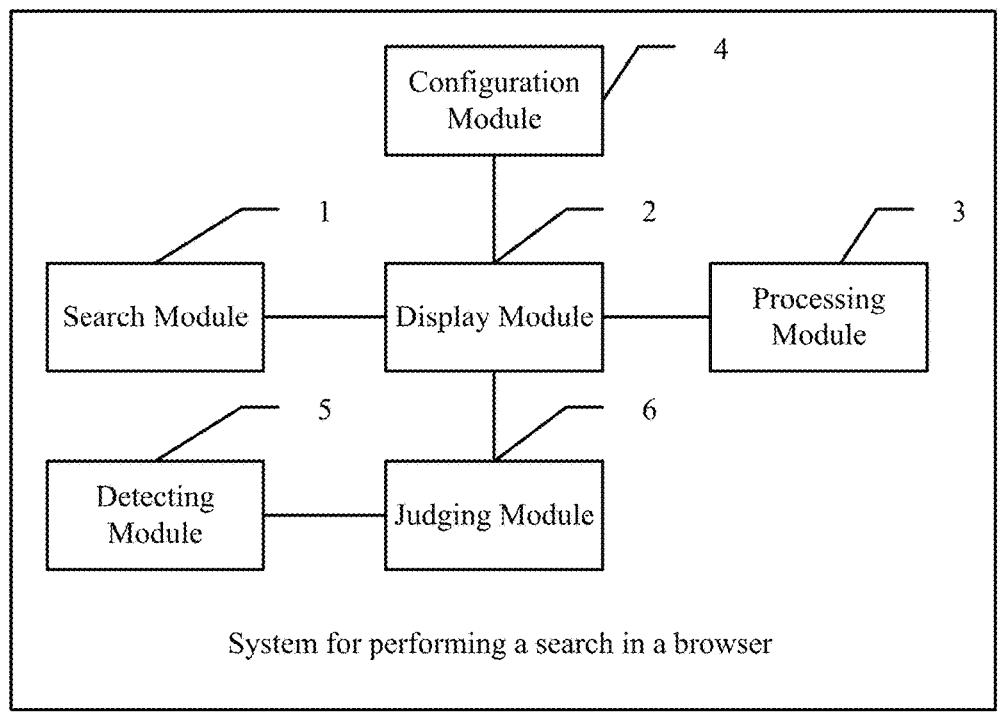
FIG. 5 illustrates a structure schematic diagram of another exemplary system for performing a search in a browser consistent with the disclosed embodiments.

FIG. 5 illustrates a structure schematic diagram of another exemplary system for performing a search in a browser consistent with the disclosed embodiments. The system may include a search module 1, a display module 2, a processing module 3, a configuration module 4, a detecting module 5, and a judging module 6. For illustration purposes, only related parts are illustrated herein. The search module 1, the display module 2 and the processing module 3 are the same as the corresponding modules shown in FIG. 4.

The configuration module 4 is configured to create a search engine set and embed the configured search engine set in a browser. The configuration module 4 is also configured to obtain the search engines from the server to form a search engine set.

A search engine set is preset by the configuration module 4, so that when detecting that an operation event of a user meets preset switching criteria, one or more search engines can be extracted from the search engine set and displayed for the user as alternative search engines.

The detecting module 5 is configured to detect the operation event of the user in the search engine results page.

The judging module 6 is configured to determine whether the detected operation event meets preset switching criteria. Further, the judging module 6 may include a first judging unit and a second judging unit.

The first judging unit is configured to determine whether the operation event of the user in the search engine results page is a scrolling operation event and whether the scrolling operation event controls the search engine results page to scroll to the bottom of the page. If the operation event is a scrolling operation event and the scrolling operation event controls the search engine results page to scroll to the bottom of the page, it is determined that the scrolling operation event meets the preset switching criteria.

The second judging unit is configured to determine whether the operation event of the user in the search engine results page is a scrolling operation event and whether the scrolling operation event controls the search engine results page to scroll to the bottom of the page and re-scroll to the top of the page. If the operation event is a scrolling operation event and the scrolling operation event controls the search engine results page to scroll to the bottom of the page and re-scroll to the top of the page, it is determined that the scrolling operation event meets the preset switching criteria.

Figure 6:
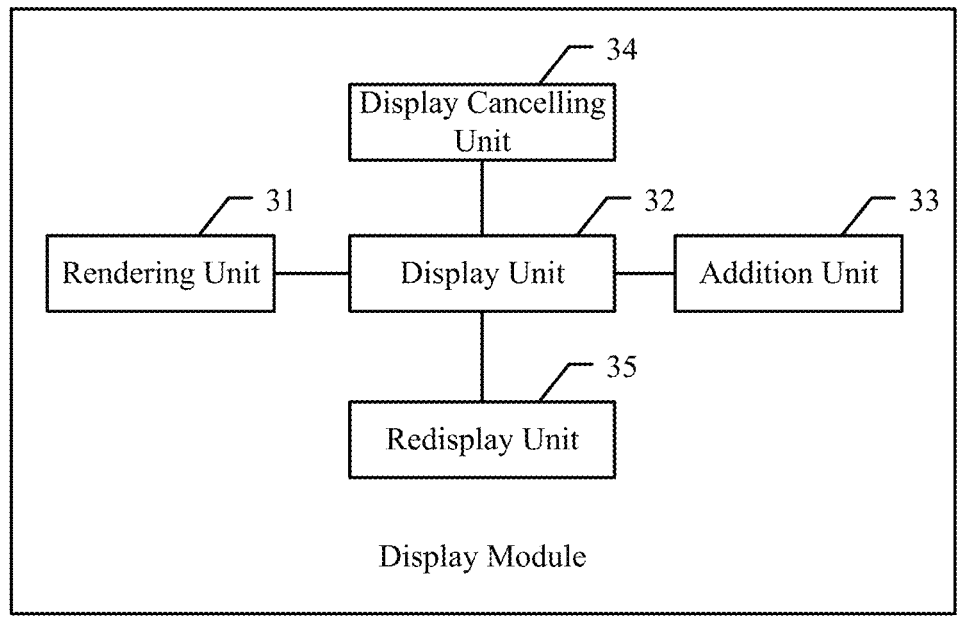
FIG. 6 illustrates a structure schematic diagram of an exemplary display module shown in FIG. 5 consistent with the disclosed embodiments.

FIG. 6 illustrates a structure schematic diagram of an exemplary display module shown in FIG. 5 consistent with the disclosed embodiments. As shown in FIG. 6, the display module 3 may include a rendering unit 31, a display unit 32, an addition unit 33, a display cancelling unit 34 and a redisplay unit 35. For illustration purposes, only related parts are illustrated herein.

The rendering unit 31 is configured to, when it is detected that an operation event of a user in a search engine results page meets preset switching criteria, render a search engine switching human-machine interactive UI. The rendering unit 31 may render the search engine switching human-machine interactive UI by calling a UI control of an operation system.

The display unit 32 is configured to add the search engines selected from a search engine set to the search engine switching UI as alternative search engines and display the alternative search engines to the user.

The display unit 32 adds the search engines selected from the search engine set configured by the configuration module 4 as the alternative search engines to the search engine switching UI to display.

The addition unit 33 is configured to, after a search engine results page of the selected alternative search engine is displayed, add the current search engine to the search engine switching UI to display.

In addition, after the search engine results page of the selected alternative search engine is displayed, the addition unit 33 may also select other search engines (except the current search engine and the selected alternative search engine) from the search engine set to add in the search engine switching UI.

After the alternative search engines are displayed, the display module 3 may further include the display cancelling unit 34 and the redisplay unit 35.

The display cancelling unit 34 is configured to, after the user clicks a search result link to enter a webpage corresponding to the search result link, control to cancel the display of the alternative search engines.

The redisplay unit 35 is configured to, if it is detected the user switches from the webpage corresponding to the search result link to the search engine results page, control to redisplay the alternative search engines.

After the search engine switching UI containing the alternative search engines is displayed, the display module 3, through the redisplay unit 35, can keep the display of the search engine switching UI when the user remains or switches to the search engine results page. In addition, the display module 3, through the display cancelling unit 34, can cancel the display of the search engine switching UI in order not to affect the user to view the webpage contents corresponding to the search result link when the user clicks and selects a webpage corresponding to a search result link in the search engine results page.

After the first search is performed, based on the user's operations, the search engine switching UI is generated by the operation system installed in the terminal to display the alternative search engines to the user, such that the user can rapidly switch from the current search engine to other search engines to repeat the search using the corresponding keywords. The search is performed automatically by using the same keywords entered by the user in the current search engine. The method meets the user's demand for automation and intelligence. The method also saves the user's time and improves the efficiency of switching search engine.

Those skilled in the art should understand that all or part of the steps in the above method may be executed by relevant hardware instructed by a program, and the program may be stored in a computer-readable storage medium such as a removable hard disk, a read-only memory (ROM), a random access memory (RAM), a magnetic disk, an optical disk, and so on.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and systems can be used in a variety of Internet applications. By using the disclosed methods and systems for webpage searching, based on the operations of the user, the alternative search engines are displayed to the user such that the user can rapidly switch from the current search engine to other search engines. Therefore, to repeat the search, this can avoid extra operations such as those that might be used to open a search webpage of the selected search engine and re-enter the keywords. Thus, the rapid switching between search engines can be realized, and users' webpage search efficiency can be improved.

What is claimed is:

1. A method for performing a search in a browser implemented by a computing terminal comprising a processor and a memory, comprising:
receiving one or more keywords entered by a user in a current search engine through the browser;
based on the keywords entered in the current search engine, searching data from the current search engine;
displaying a first search engine results page from the current search engine to the user;
after the first search engine results page is displayed, detecting an operation event of the user in the first search engine results page, the operation event being one of a scrolling operation event and a clicking event;
determining whether the operation event of the user meets preset switching criteria, wherein the preset switching criteria include at least one of: a scrolling operation event that scrolls to a bottom of the first search engine results page; a scrolling operation event that scrolls to the bottom of the first search engine results page and re-scrolls back to a top of the first search engine results page; and a clicking event on a button that requests a next results page;
when determining the operation event of the user in the first search engine results page meets the preset switching criteria, displaying alternative search engines on a search engine switching user interface, wherein the search engine switching user interface is not rendered until the operation event meets the preset switching criteria;
extracting a search web address template corresponding to an alternative search engine selected by the user;
loading the keywords entered in the current search engine into the search web address template corresponding to the alternative search engine to search data from the alternative search engine;

displaying a second search engine results page from the selected alternative search engine;

when the user clicks a search result link in the second search engine results page to enter a webpage corresponding to the search result link, cancelling display of the search engine switching user interface; and when detecting that the user returns to the second search engine results page from the webpage corresponding to the search result link, redisplaying the search engine switching user interface.

2. The method according to claim 1, before searching data from the current search engine based on the keywords entered in a current search engine and displaying a first search engine results page from the current search engine to the user, further including one of the followings:

creating a search engine set and embedding the search engine set in the browser; and forming the search engine set by obtaining the search engines from a server.

3. The method according to claim 2, wherein displaying the alternative search engines comprises:

determining a number of the alternative search engines to be selected based on a screen size of the computing terminal; and randomly select the number of the alternative search engines from the search engine set; and adding the randomly selected alternative search engines to the search engine switching user interface.

4. The method according to claim 3, wherein adding the randomly selected alternative search engines comprises:

adding search engine icons of the randomly selected alternative search engines to the search engine switching user interface; and respectively associating preset search web address templates of the randomly selected alternative search engines to the corresponding search engine icons.

5. The method according to claim 1, wherein displaying alternative search engines when detecting that an operation event of a user in the first search engine results page meets preset switching criteria further includes:

when it is detected that the operation event of the user in the first search engine results page meets the preset switching criteria, rendering the search engine switching user interface; and adding search engines from the search engine set as the alternative search engines to the search engine switching user interface for display.

6. The method according to claim 5, after displaying the second search engine results page from the selected alternative search engine, further including:

adding the current search engine to the search engine switching user interface for display on the second search engine results page.

7. The method according to claim 1, further comprising:

blocking a partial view of the first search engine results page by overlaying the search engine switching user interface on the first search engine results page.

8. The method according to claim 1, wherein loading the keywords entered in the current search engine into the search web address template corresponding to the alternative search engine comprises:

forming a web address by adding the keywords to follow a last symbol of the search web address template corresponding to the alternative search engine; and visiting the formed web address to search data from the alternative search engine.

9. A system for performing a search in a browser, comprising:

a memory; and a processor coupled to the memory and configured to:

based on keywords entered by a user in a current search engine of the browser, search data from the current search engine and display a first search engine results page from the current search engine to the user;

after the first search engine results page is displayed, detect an operation event of the user in the first search engine results page, the operation event being a scrolling operation event;

determine whether the operation event of the user meets preset switching criteria;

when determining the operation event of the user in the first search engine results page meets the preset switching criteria, displaying alternative search engines on a search engine switching user interface, wherein the search engine switching user interface is not rendered until the operation event meets the preset switching criteria; and extract a search web address template of an alternative search engine selected by the user;

load the keywords entered in the current search engine into the search web address template of the selected alternative search engine to search data from the alternative search engine;

display a second search engine results page from the selected alternative search engine;

when the user clicks a search result link in the second search engine results page to enter a webpage corresponding to the search result link, cancel display of the search engine switching user interface; and when detecting that the user returns to the second search engine results page from the webpage corresponding to the search result link, redisplay the search engine switching user interface, wherein the processor is further configured to:

when the operation event is a scrolling operation event that scrolls to a bottom of the first search engine results page, or when the operation event is a scrolling operation event that scrolls to the bottom of the first search engine results page and re-scrolls back to a top of the first search engine results page, determine that the scrolling operation event meets the preset switching criteria.

10. The system according to claim 9, wherein the processor is further configured to:

create a search engine set and embed the search engine set in the browser; and form the search engine set by obtaining the search engines from a server.

11. The system according to claim 9, wherein the processor is further configured to:

when it is detected that the operation event of the user in the first search engine results page meets the preset switching criteria, render the search engine switching user interface; and add the search engines from the search engine set as the alternative search engines to the search engine switching user interface and display the alternative search engines to the user.

12. The system according to claim 11, wherein the processor is further configured to, after the second search engine results page from the selected alternative search engine is displayed, add the current search engine to the search engine switching user interface to display on the second search engine results page.

13. The system according to claim 11, wherein the processor is further configured to:
when rendering the search engine switch user interface, block a partial view of the first search engine results page by overlaying the search engine switching user interface on the first search engine results page.

14. A non-transitory computer readable storage medium storing computer program instructions that, when being executed by a processor, cause the processor to:
based on keywords entered by a user in a current search engine of the browser, search data from the current search engine and display a first search engine results page from the current search engine to the user;
after the first search engine results page is displayed, detect an operation event of the user in the first search engine results page, the operation event being one of a scrolling operation event and a clicking event;
determine whether the operation event of the user meets preset switching criteria;
when determining the operation event of the user in the first search engine results page meets the preset switching criteria, displaying alternative search engines on a search engine switching user interface, wherein the search engine switching user interface is not rendered until the operation event meets the preset switching criteria; and
extract a search web address template of an alternative search engine selected by the user;
load the keywords entered in the current search engine into the search web address template of the selected alternative search engine to search data from the alternative search engine;
display a second search engine results page from the selected alternative search engine;
when the user clicks a search result link in the second search engine results page to enter a webpage corresponding to the search result link, cancel display of the search engine switching user interface; and
when detecting that the user returns to the second search engine results page from the webpage corresponding to the search result link, redisplay the search engine switching user interface,
wherein the processor is further configured to:
when the operation event is a scrolling operation event that scrolls to a bottom of the first search engine results page, or when the operation event is a scrolling operation event that scrolls to the bottom of the first search engine results page and re-scrolls back to a top of the first search engine results page, or when the operation event is a clicking event on a button that requests a next results page, determine that the scrolling operation event meets the preset switching criteria.

15. The storage medium according to claim 14, wherein the computer program instructions further cause the processor to:
create a search engine set and embed the search engine set in the browser; and
form the search engine set by obtaining the search engines from a server.

16. The storage medium according to claim 14, wherein the computer program instructions further cause the processor to:
when it is detected that the operation event of the user in the first search engine results page meets the preset switching criteria, render the search engine switching user interface;
add the search engines from the search engine set as the alternative search engines to the search engine switching user interface and display the alternative search engines to the user; and
after the second search engine results page from the selected alternative search engine is displayed, add the current search engine to the search engine switching user interface to display on the second search engine results page.

* * * * *